United States Patent [19]

Young

[11] 4,135,392
[45] Jan. 23, 1979

[54] EQUIPMENT MOUNTING AND MONITORING SYSTEM

[75] Inventor: Sheldon E. Young, Western Springs, Ill.

[73] Assignee: Vibro/Dynamics Corporation, LaGrange, Ill.

[21] Appl. No.: 816,431

[22] Filed: Jul. 18, 1977

Related U.S. Application Data

[63] Continuation-in-part of Ser. No. 652,203, Jan. 26, 1976, Pat. No. 4,047,427, and a continuation-in-part of Ser. No. 679,938, Apr. 26, 1976, abandoned.

[51] Int. Cl.² .............................................. G01L 5/00
[52] U.S. Cl. ................................... 73/141 A; 177/211
[58] Field of Search ............... 73/141 A, 141 R, 88 F; 177/211

[56] References Cited

U.S. PATENT DOCUMENTS

| | | | |
|---|---|---|---|
| 2,386,879 | 10/1945 | Ostergren | 338/2 |
| 2,873,341 | 2/1959 | Kutsay | 73/88 F |
| 2,980,414 | 4/1961 | Perry et al. | 177/211 |
| 3,072,209 | 1/1963 | Perry | 177/211 |
| 3,090,226 | 5/1963 | Corti et al. | 73/141 A |
| 3,113,631 | 12/1963 | Moulin et al. | 177/211 |
| 3,277,718 | 10/1966 | Ruge | 73/141 A |
| 3,332,647 | 7/1967 | Young | 248/24 |
| 3,621,927 | 11/1971 | Ormond | 73/141 A |
| 4,044,920 | 8/1977 | Swartzendruber | 73/141 A |
| 4,047,427 | 9/1977 | Young | 73/141 A |

Primary Examiner—Anthony V. Ciarlante
Attorney, Agent, or Firm—E. Manning Giles

[57] ABSTRACT

A system of vibration-absorbing, height-adjustable, force-sensing components, adapted to be incorporated in support members of a unit of industrial equipment to enable precise alignment and balancing of such equipment, to minimize noise generated thereby and to achieve greater precision and efficiency by fine tuning the performance thereof. The system has cooperating load indicating means which provide for read-out of forces exerted on the respective support members. Additionally, the system may include means for indicating power consumption during operation. When the equipment is at rest, static load forces are indicated. Applicant's system permits preliminary adjustment for balancing load distribution when the equipment is at rest. Then, during operation, further adjustments may be made, based upon monitoring of read-outs of dynamic and enertia forces and power consumption, in order to obtain optimum stability, alignment, damping of vibration and shock, and noise control.

7 Claims, 8 Drawing Figures

EQUIPMENT MOUNTING AND MONITORING SYSTEM

RELATED APPLICATIONS

This application is a continuation-in-part of applicant's copending applications Ser. No. 652,203, filed Jan. 26, 1976 now U.S. Pat. No. 4,047,427, for "Load-Sensing Vibration Isolator" and Ser. No. 679,938, filed Apr. 26, 1976 now abandoned, for "Load-Sensing Support System", the disclosure of which are incorporated herein by reference and made a part hereof.

BACKGROUND OF THE INVENTION

Many types of industrial equipment, such as machine tools, production presses, rotary air compressors and others, generate objectionable levels of dynamic shock, vibration forces and noise during operation. Other types of industrial equipment are adversely affected by shock and vibration which may be transmitted to them through the factory floors or foundations on which they are mounted. Some such equipment may be unstable because of cyclical thrust forces or changes in center of gravity which occur during operation. Additionally, most mechanically operable industrial equipment is susceptible to misalignment by reason of load or dynamic forces exerted upon the supporting framework, and when a machine is not properly aligned, the bearings or guides are likely to develop excessive friction, waste energy and wear out faster.

For many years, factory installation and maintenance personnel have attempted to alleviate these problems by using resilient mounts to cushion vibration or shock and by painstakingly shimming up the equipment at various support points so as to improve the alignment. Such equipment is sometimes bolted to the factory floor or to a massive foundation to hold it securely in place. The inadequacy of these procedures for optimizing equipment performance has become increasingly apparent to those who have made a serious study of the operational dynamics of industrial equipment. Moreover, as production equipment continues to become more sophisticated and costly, it is increasingly apparent that a more scientific approach is needed, not only to the initial installation of such equipment, but also to the subsequent monitoring of its performance. For example, when changes are made in the moving parts attached to the machine, or when operating speeds are changed, these may affect the dynamic or load forces exerted by the equipment. Unless those forces can be monitored during operation, there is no reliable way of ascertaining when potentially hazardous dynamic forces are developing or determining when the maximum safe operating speed has been reached. As will be understood, a machine that is out of balance by an insignificant amount at a particular operating speed may become dangerously unbalanced if the operating speed is increased, or one set of dies is replaced with a heavier set. Conversely, a reduction in the weight of certain moving parts might permit an increase in the safe operating speed, provided the operator had some way of measuring quantitatively the changes in operating dynamics under varying operating conditions.

Recent developments in legislation relating to occupational safety and health and to environmental protection have made it increasingly important for plant managements to be able to measure, analyze and control the vibration, shock and noise generated by operating equipment. Such studies of equipment operation are usually made with whatever measuring instruments may be available for making various tests. In some cases sensors, such as accelerometers, are attached to the exterior surface of the machine. In others, sensors such as load cells are interposed between the machine mounting foot and the foundation. Occasionally, resistance strain gauges are applied directly to machine elements such as support legs to determine forces in such elements. The introduction of such extraneous measuring devices into a unit of equipment under observation may affect the validity of the results. As an example, the interposition of extraneous load cells into the machine support system may have some effect on the operating characteristics they are intended to measure.

It was the need for noise suppression, vibration control and precision adjustability to compensate for floor irregularities and misalignment which led to the development of adjustable vibration isolators of the type disclosed in my U.S. Pat. No. 3,332,647, granted July 25, 1967. Such isolators have been widely adopted because of the contribution they make to quieter, more efficient operation of industrial equipment.

Despite the contribution which adjustable vibration isolators have made to quieter, safer and more efficient plant operation, their full potential has not been realized because of the lack of practical means for continuous monitoring of the operating characteristics of the equipment mounted thereon and of the dynamic forces generated thereby, because of the inconvenience of having to attach sensors to existing equipment installations and because the data obtained therefrom is likely to be misleading due to the influence of extrinsic factors.

SUMMARY OF THE INVENTION

The present invention relates to a system of mounts for industrial equipment, each of said mounts having load-sensing means and a resilient member incorporated therein, at least one of the mounts being height-adjustable. The load-sensing means of each mount is connected electrically to a corresponding load indicator, and the system may also include a cooperating meter which serves to indicate power consumption by the supported equipment during operation.

Each mount has a top portion that is attachable to one of the legs or feet of the equipment, a resilient member which rests upon the floor or foundation on which the equipment is supported, a bearing plate superposed upon the resilient member, and a spacing member through which forces exerted on the top portion are communicated to the bearing plate. In each height-adjustable mount, the spacing member may be adjusted to increase or reduce the spacing of the top portion from the bearing plate, thereby reapportioning the force exerted by the top portion of all the respective mounts upon the corresponding bearing plates and resilient members.

The load-sensing means is one or more strain gauges, incorporated either in the spacing member or in the assembly comprising the bearing plate and the resilient member, so that such means is responsive to forces exerted on the top portion of the mount by the equipment to which it is attached in supporting relation.

It is a principal object of my invention to provide a system of resilient, adjustable mounts with integral load and force-sensing means, on which industrial machines may be mounted, including suitable read-out facilities enabling installers, operators and others to have instant data in regard to static loads exerted upon individual mounts, and in regard to dynamic and load forces generated during machine operation.

It is another important object of my invention to offer means whereby industrial engineers can study changes in center of gravity, inertia forces and other load and force factors affecting machine stability and safety, while it is in operation.

It is a further object of my invention to provide facilities for determining the safe maximum operating speed for presses and similar equipment of the type which are subject to instability due to dynamic forces.

It is a still further object of my invention to provide a mounting system with the capability of detecting misalignment of a unit of equipment by indicating excess power consumption so that by adjusting individual mounts while monitoring power consumption data, internal misalignment can be corrected.

Broadly, it is the purpose of my invention to provide a system of adjustable, load-sensing, cushioned machinery mounts and cooperating means for indicating static and dynamic forces and related data for use in monitoring the operation of industrial equipment mounted thereon so as to provide immediate read out of load and dynamic forces and energy consumption as the respective mounts are adjusted during operation so as to insure optimum performance of such equipment. My system enables what I refer to as "fine tuning" of machinery installations for maximum safety, operating efficiency and productivity, while significantly reducing operational noise, vibration and impact shock.

BRIEF DESCRIPTION OF THE DRAWINGS

The preferred embodiment and illustrative alternative embodiments of my invention are shown in the accompanying drawing in which.

DESCRIPTION OF THE PREFERRED EMBODIMENT

Figure 1:
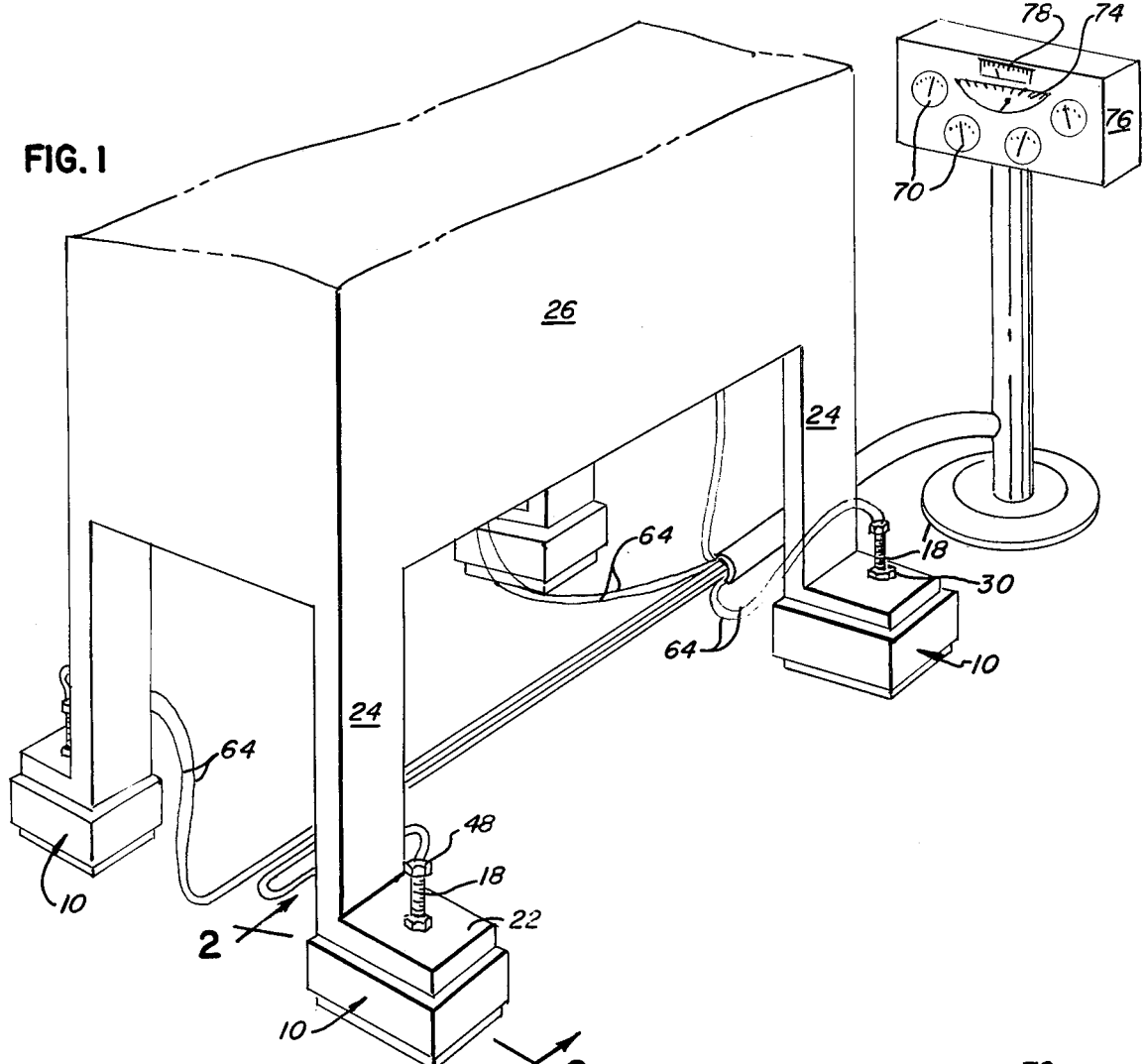
FIG. 1 is a perspective view of a unit of industrial equipment supported on a system of adjustable, load-sensing cushioned mounts with cooperating data-indicating means embodying my invention.
Figure 2:
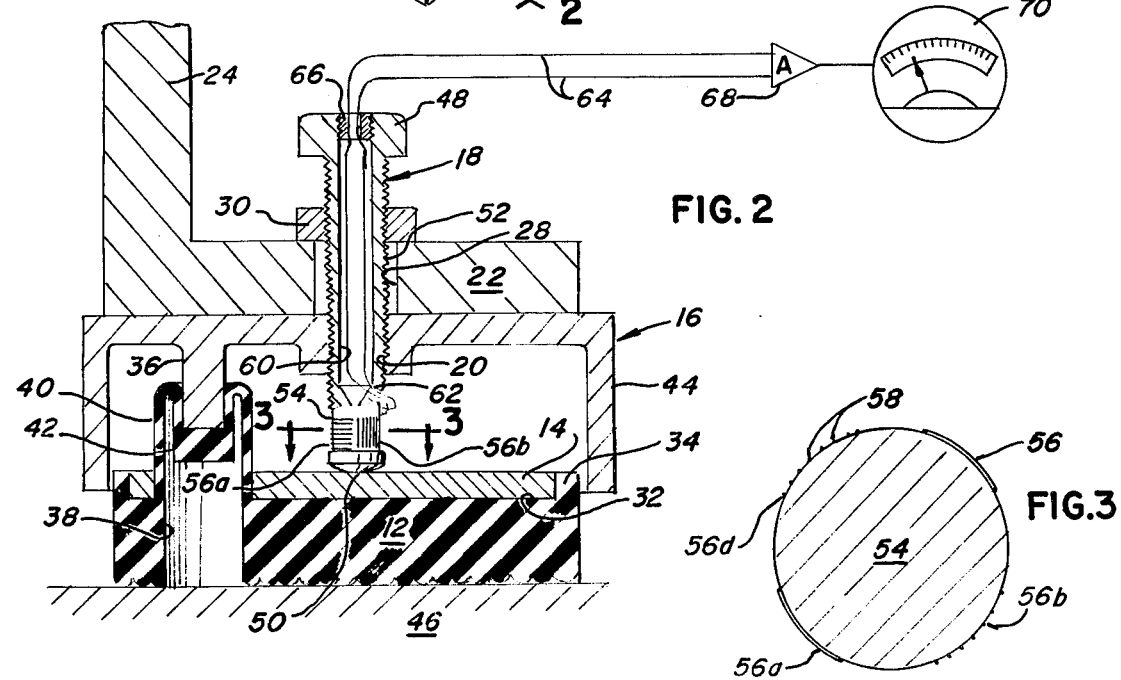
FIG. 2 is a sectional view on the bent line 2—2 of FIG. 1.
Figure 3:
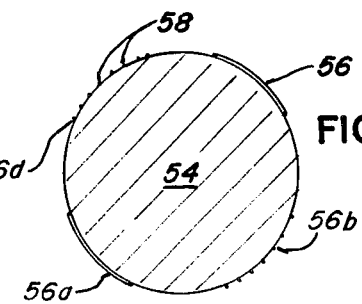
FIG. 3 is a view on the line 3—3 of FIG. 2.

Referring to FIGS. 1 and 2, the mounts embodying my invention are designated generally by the reference numeral 10 and comprise a resilient base 12, a bearing plate 14 supported thereon, and a cover member 16 superposed thereover and spaced therefrom by means of an externally threaded, bolt-like spacing member 18 which is engaged in an internally threaded hole 20 in said cover member 16.

Each mount 10 is secured to the foot portion 22 of one of the legs 24 of a unit of industrial equipment 26, such as a machine or press of some character. Each foot 22 is provided with a hole 28 through which the spacing member 18 is adapted to pass, the foot 22 being held securely between the cover 16 and a lock nut 30, as shown.

The resilient base member 12 is a relatively thick body of compressible, rubber-like material such as Neoprene. In the preferred form shown in FIG. 2, the resilient base 12 is of generally rectangular form and may be provided with a shallow recess 32 on its top side, surrounded by an upstanding peripheral wall 34, thus forming a seat to receive the bearing plate 14 and to prevent lateral displacement of said plate 14.

The cover 16 is provided with a plurality of integral, downwardly depending fingers 36 of the type shown and described in my U.S. Pat. No. 3,332,647, and the base 12 is provided with cooperating socket-like openings 38 disposed immediately under the respective fingers 36. Surrounding the top of each socket 38 is an integral, upstanding flexible gripper 40 with an inwardly doubled back portion 42 of reduced lateral dimension adapted to fit snugly on the lower tip of the corresponding finger 36 and to resist removal therefrom. Each socket 38 is of sufficiently greater diameter than the outside diameter of the corresponding doubled back portion 42 to allow unobstructed, free axial movement of said portion 42 and the finger 36 gripped thereby with respect to the socket 38. The fingers 36 and grippers 40 serve to keep the base member 12 and cover member 16 assembled and to resist lateral displacement of either member with respect to the other. The number of fingers and grippers to be used is optional, but I have found that three is a convenient number to use for circular isolators and four for rectangular. In order to show the finger and gripper assembly in the preferred embodiment of FIG. 2, the line 2—2 of FIG. 1 on which the sectional view is taken is bent to pass through the finger and gripper adjacent one corner of the mount 10.

Preferably, the cover 16 is provided with an integral, downwardly depending, marginal skirt 44 which serves to protect the base member 12 and the interior between the base 12 and cover 16 assembly from accidental damage. The base 12 may be made of any suitable resilient material, depending upon where it is to be used, the weight of the machine it is intended to support, the speed at which the machine is to run, and the nature of the impact shock the mount is intended to support, and other pertinent data. The bottom side of the base 12 may be grooved or otherwise provided with surface irregularities as shown sectionally in FIG. 2 to resist lateral displacement from a selected position on the factory floor or foundation 46.

The shaft-like, adjustable spacing member 18 is of high grade, machinable, tempered steel, and has a hexagonal head 48 at one end, and a rounded bearing portion 50 at the other end. The spacer 18 has an externally threaded body portion 52, extending from the head 48 to a cylindrical shank 54 of slightly reduced diameter, adjacent to bearing portion 50.

The shank 54 is provided with four strain gauges 56a, 56b, 56c, and 56d, spaced at 90 degree intervals around the shank 54. Each strain gauge 56 consists of a continuous length of fine resistance wire 58 arranged in a large number of back and forth linear rows in closely spaced, parallel relation and bonded with suitable adhesive to the surface of the shank 54. Two diametrically opposed strain gauges, 56a and 56c, have their linear rows of wire disposed in a plurality of circumferential arcs; the other two strain gauges, 56b and 56d, have their wires disposed in a plurality of rows parallel to the axis of the spacer 18.

Preferably, the spacer 18 has a central bore 60 which extends axially from the head 48 to the shank 54 and is substantially co-extensive with the threaded cylindrical body 53 with an oblique hole 62 at the lower end of the bore 60 communicating with the exterior of the shank 54. Wires 64 are connected in circuit with the strain gauges 56a, 56b, 56c and 56d and pass therefrom through the oblique hole 62, up through the axial bore 60, and out through the center hole in an annular fitting 66 which is threadably engaged in the hexagonal head 48 of the spacer 18. The wires 64 lead to an amplifier 68 which, in turn, is connected to read-out meter 70.

Figure 4:
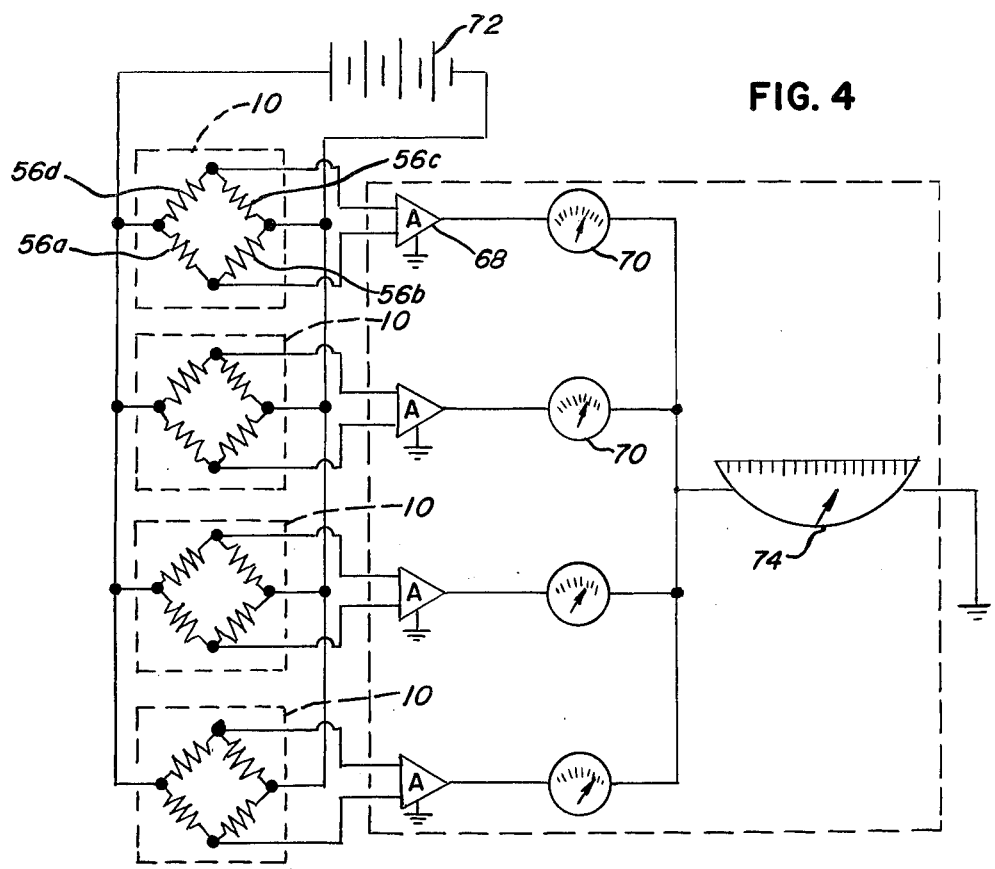
FIG. 4 is a schematic diagram of the electrical circuitry in the preferred embodiment of the invention.

In my preferred embodiment, the strain gauges 56a–d are connected in a Wheatstone bridge circuit as shown schematically in FIG. 4. Each mount 10 (indicated by dotted lines) has four strain gauges 56a, 56b, 56c, and 56d connected in a Wheatstone bridge circuit to a suitable source of electricity 72 substantially as shown. Each Wheatstone bridge circuit is connected electrically to a corresponding amplifier 68, and each amplifier supplies an amplified signal to a corresponding read-out device, such as meter 70, which may be calibrated in pounds or kilograms or other load of force units. Preferably, each strain gauge circuit is provided with an output jack (not shown) so as to permit attaching an oscilloscope, recorder, or other means which will enable analyzing or making a record of the signal changes caused by the dynamic forces exerted upon the corresponding mount 10. If desired, the combined signals from the respective meters 70 may be supplied to a master meter 74, as shown, to totalize the load or force exerted upon the system of mounts 10.

The ultra thin resistance wire 58 of each strain gauge 56a–d is affixed to the appropriate surface of the shank 54 in such a manner that any deformation of the shank causes a corresponding deformation of the wire 58, such as a stretching or reduction in length thereof. When the wire 58 is stretched, its electrical resistance is increased; when reduced in length, the electrical resistance is reduced. Where, as in the illustrated embodiment, the strain gauges comprising one arm of the bridge circuit are horizontal and those comprising the other arm are vertical, any end-to-end force exerted upon the spacer 18 will cause a microscopic circumferential bulging of the shank 54 and a correspondingly minute axial compression thereof.

The read-out to be obtained at any one time on the meter 70 depends upon the difference in electrical resistance between the strain gauges 56a and c, comprising one arm of the bridge circuit, and that of strain gauges 56b and d, comprising the other arm thereof. As will be understood, any change in the force exerted through the shank 54 will increase or reduce the reading on the meter 70 in proportion to any change in the deformation of the shank 54 and the strain gauges 56a–d affixed thereto.

As shown in FIG. 1, the meters 70 and a master meter 74 may be housed in a meter box 76, located on or near the unit of equipment 26. Each meter 70 is connected to one of the mounts 10, as hereinbefore described. When the equipment is idle, each of the meters 70 will indicate the static load supported by the mount 10 to which it is connected. Assuming that the load is not properly distributed, the equipment operator or plant engineer may then loosen lock nuts 30 on the respective mounts 10 so as to permit selectively turning the hexagonal heads 48 of the spacers 18 one way or the other to make fine adjustments in the spacing between cover 16 and bearing plate 14, which serves to redistribute the static load supported by each of the mounts 10 comprising a particular mounting system. When optimum static load distribution is obtained, the lock nuts 30 are tightened securely to prevent the spacers 18 from being turned accidentally.

The equipment is then placed in operation and, depending upon the specific operating dynamics, the read-out provided by each of the meters 70 will vary during each operating cycle, indicating the variations which occur in the dynamic forces being exerted upon each mount 10. In some instances, the variations may be inconsequential so as to obviate the need for any further adjustment of the mounts 10. Where the variations occur rapidly, it may be necessary to check them with an oscilloscope as previously explained.

If the equipment generates potentially hazardous dynamic forces during operation, it is important to study those forces, as shown by the meters 70 during operation, and to make careful further adjustments of the spacers 18 as necessary to distribute the dynamic load supported by each of the respective mounts 10 so as to maximize the stability of the equipment and optimize its performance. In the case of presses, for example, each time the dies are changed, the operating dynamics are affected, and it may be necessary to adjust the mounts for maximum stability. Also by studying the meters 70 or suitable oscilloscopes, the press operator can check the upward dynamic forces at various operating speeds and make sure that the press is not operated at a speed where such forces exceed the safe limit.

In order to obtain optimum equipment performance, it is often very important to make sure that the internal alignment of the unit of equipment is proper and, for this purpose, an ammeter 78 may be included in my system, mounted on the meter box 76 or the equipment casing along with the meters 70 and connected to the electric line which powers the equipment 10, so as to indicate power consumption during operation. In many instances, neither leveling nor proportional distribution of static load is sufficient to insure proper internal alignment. In such instances, it is advantageous to be able to monitor power consumption, as shown on the ammeter 78, while making minute adjustments of the various spacers 18 so as to find support levels at which power consumption is minimized, thus indicating that internal friction due to misalignment has been reduced or eliminated.

Figure 5:
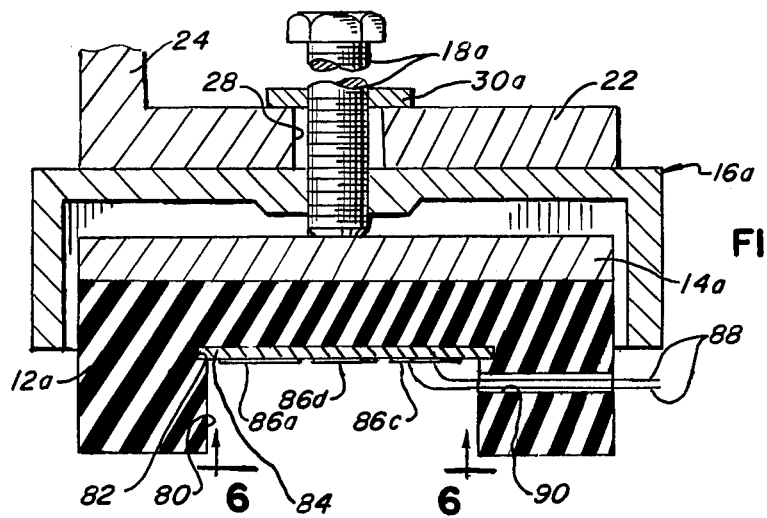
FIG. 5 is a view corresponding to FIG. 2, but showing an alternative embodiment of the mount portion of my invention.
Figure 6:
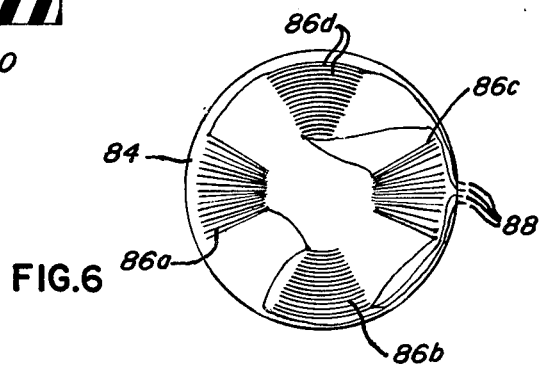
FIG. 6 is a view on the line 6—6 of FIG. 5.

Another form of the adjustable load-sensing, vibration-damping mount embodying my invention is shown in FIGS. 5 and 6, wherein the resilient base 12a has a cylindrical recess 80 on the under side. An outwardly extending peripheral groove 82 around the top of the recess 80 serves as a seat for a disc 84 to which strain gauges 86a, 86b, 86c and 86d are affixed. As shown in FIG. 6, the minute wires comprising strain gauges 86a and 86c are oriented substantially radially and those comprising strain gauges 86b are disposed in successive circumferential arcs. The strain gauges 86a–d are connected in a bridge circuit and wires 88 pass through an aperture 90 in the base 12a to a source of electrical current and to meters 70, substantially as shown schematically in FIG. 4.

A bearing plate 14a on the base 12a supports a spacing member 18a which is threadably engaged in the cover 16a and holds the foot 22 of a machine clamped between the cover 16a and lock nut 30a. The load force exerted by the foot 22 is communicated through the spacer 18a to the center of the top surface of the bearing plate 14a. The force so exerted causes a slight "dishing" of the bearing plate 14a, which causes a corresponding deformation of the disc 84, thus altering the electrical resistance of the respective strain gauges 86a–d, substantially as heretofore described.

Figure 7:
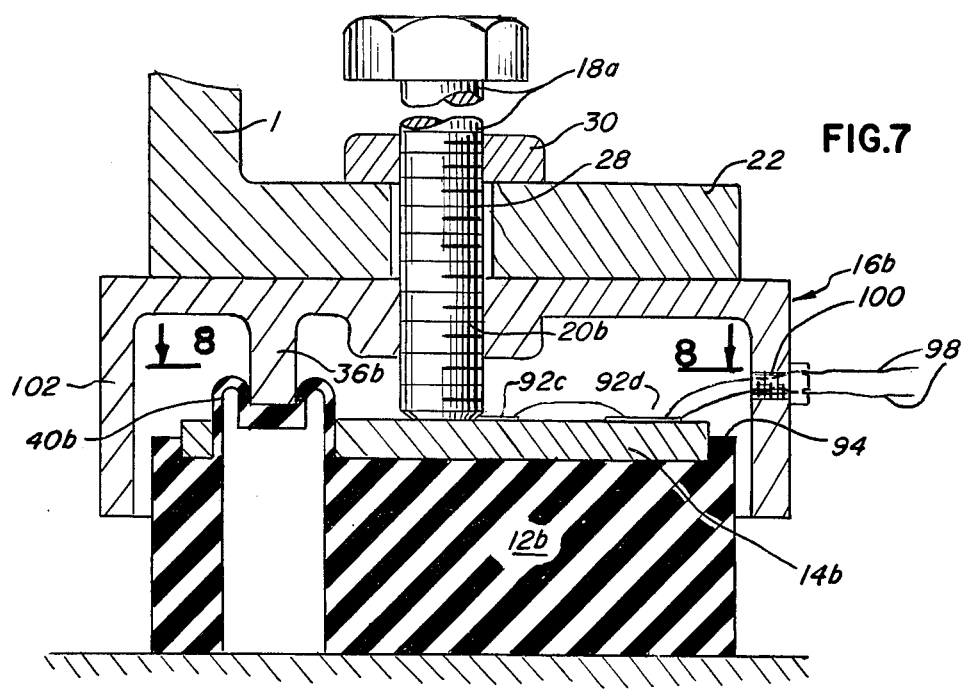
FIG. 7 is a view similar to FIG. 2 but showing another alternative form of the mount component of my invention.
Figure 8:
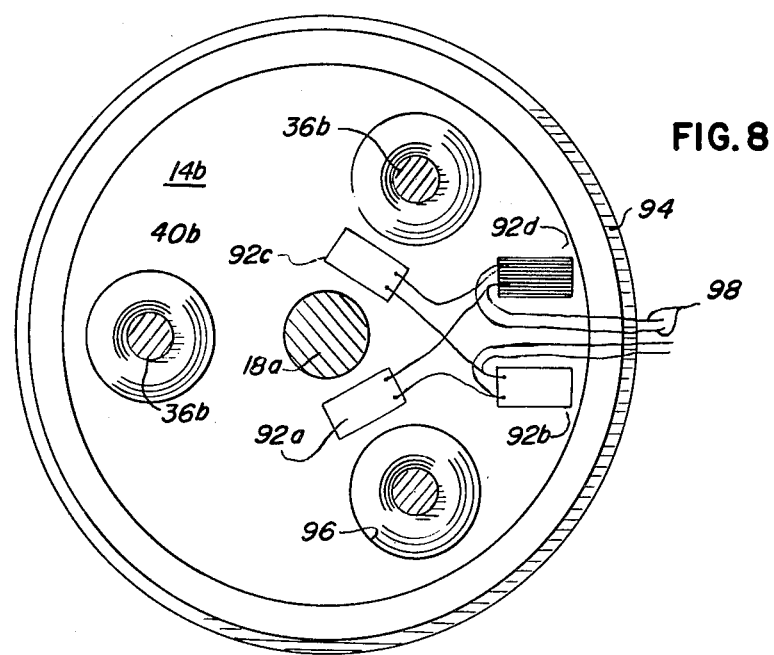
FIG. 8 is a view on the line 8—8 of FIG. 7.

FIGS. 7 and 8 show another embodiment of the mount and load-sensing means for use in my mounting and monitoring system for industrial equipment. In this embodiment, the strain gauges 92a, 92b, 92c and 92d are affixed to the top surface of bearing plate 14b which is supported on resilient base 12b. The bearing plate 14b is held against displacement by the peripheral wall 94 surrounding the top of the base 12b. The bearing plate 14b may be provided with three circular openings 96 as shown, spaced 120 degrees apart, which are adapted to receive three correspondingly spaced grippers 40b which engage downwardly depending fingers 36b on the under side of cover 16b. Strain gauges 92a and 92c are affixed to said bearing plate 14b in transverse relation to the common diameter of said plate and the nearest adjacent circular opening 96; as shown in FIG. 8. Wires 98 pass through a fitting 100 which is engaged in an opening in the skirt portion 102 of the cover 16b. As in the previously described embodiments, the strain gauges 92a–d are preferably connected in a bridge circuit as exemplified in FIG. 4. The load and dynamic forces exerted through the spacer 18b upon the bearing plate 14b cause it to "dish" somewhat by reason of the resilient character of the supporting base 12b and such deformation of the plate affects the electrical resistance properties of the strain gauges 92a–d, as previously described.

Many industrial plants are using adjustable isolators of the type shown in my U.S. Pat. No. 3,332,647 as mounts for their presses and other production equipment. Where such mounts are already in use, they may be provided with load-sensing capability by removing the original bearing plate and substituting plates 14b, as described herein, with strain gauges 92a–d affixed thereto. Alternatively, the original leveling screws or adjusting bolts of my patent isolators may be removed and spacing members 18, as shown particularly in FIG. 2, may be substituted therefor. Both the plates 14b and the spacing members 18 are provided with wires which may be connected to a suitable source of electricity and to meters 70 so as to upgrade the patented isolators as part of a mounting and monitoring system embodying my present invention.

With respect to the master meter 74, which shows the cumulative total of the load readings on the respective individual meters 70, read-outs can be used for various purposes. Where floor loading is critical, it is useful to be able to ascertain not only the static weight of the equipment, but also the maximum load force exerted upon the plant floor during operation. Where the weight of work-pieces needs to be checked for any reason, readings can be taken on the master meter 74 before and after the work piece is placed on the equipment, the difference being the weight of the work piece.

The herein described mounting and monitoring system can be modified in various ways to adapt it to the specific mounting and operating problems associated with different types of equipment. For example, where a unit of equipment is of considerable length or width, or is exceptionally heavy, it may be necessary to use a fairly large number of selectively spaced mounts to provide proper support. Such equipment may be especially vulnerable to internal misalignment of the type which causes excessive internal friction and wear. By installing such equipment on a system of mounts embodying my invention, it is possible to ascertain quickly the load and dynamic forces exerted upon each mount. Then, by adjusting individual mounts, the load may be reapportioned to improve internal alignment. For optimum alignment, it is desirable for the system to provide power consumption data as hereinbefore described so as to enable load reapportionment based in part on its effect upon power consumption.

I contemplate that my system may also be provided with optional features such as alarm devices and automatic shut-offs. For example, an alarm or automatic shut-off could be wired into the mounting system of a press so as to be activated by a reduction of the measured force on any of the mounts in the system to a predetermined low level. Such reduction in force would be indicative of potentially dangerous upward dynamic forces, and these could adversely affect the stability of the press. In such circumstances, an alarm in the system would warn the operator to reduce speed, or a shut-off could automatically stop the press from operating.

It should be understood that the embodiments of my invention as shown and described herein are exemplary of preferred forms thereof. It will be apparent to persons skilled in the art, however, that diverse modifications and embodiments are within the contemplation of my inventive concept, the scope of which is to be determined by the appended claims.

I claim:

1. An improved, adjustable, load and force transferring component interposable in a machinery mount between a bearing member supported on a compressible, resilient base and a machinery supporting member wherein said component comprises a substantially cylindrical metallic body having integral first, second, third and fourth portions and wherein;

said first portion is adjacent one end of said body and engageable by suitable means for precisely controlled axial rotation of said body in alternate directions;

said second portion comprises a protrusion at the opposite end of said body adapted to be supported in bearing relation on a planar portion of said bearing member;

said third portion extends from adjacent said first portion toward said second portion and is externally threaded for axially rotatable engagement in a cooperating, internally threaded opening in said supporting member;

said fourth portion comprises a shank interposed between said second and third portions and has a precision-machined peripheral surface, said fourth portion being minutely and uniformly deformable when subjected to axial forces exerted upon said body between said second and third portions;

a strain gauge secured to the peripheral surface of said fourth portion;

a substantially axial passage within said body, substantially coextensive with said third portion;

a first opening extending substantially radially from said passage to the exterior of said body adjacent said fourth portion;

a second opening extending from said passage to the exterior of said body adjacent said first portion; and a plurality of lead wires electrically connected to said strain gauge and extending therefrom through said first opening and said passage to said second opening for connection to a source of electrical current and to suitably calibrated read-out means.

2. The improved, adjustable load and force transferring component of claim 1 wherein said first portion is a multi-sided head adapted to be gripped by a suitable wrench and said second portion is convexly rounded to permit laterally slidable bearing support upon the planar surface of said bearing member.

3. The improved, adjustable load and force transferring component of claim 2 wherein said body is of tempered steel and said fourth portion has a precision-machined cylindrical surface.

4. The improved, adjustable load and force transferring component of claim 3 wherein a plurality of strain gauges are secured in spaced relation upon the precision-machined cylindrical surface of said fourth portion.

5. An improved adjustable, resilient mount for use as part of a mounting and monitoring system for industrial equipment wherein said mount comprises, in combination, the improved, adjustable load and force transferring component of claim 1 and a supporting member attachable in supporting relation to a unit of equipment at a selected supporting location, said member having an internally threaded opening engageable with the third portion of said component;

a resilient, compressible base member, adapted to rest upon a suitable supporting substructure; and a bearing member including opposed supporting and supported sides, said supported side being juxtaposed upon said base member and said supporting side having a planar surface upon which the second portion of said load and force transferring component is supported in substantially perpendicular, axial relation.

6. In an improved mounting and monitoring system for industrial equipment wherein a plurality of resiliently compressible, height-adjustable mounting devices are interposed in supporting relation at selected locations between a unit of such equipment and a supporting substructure, the improvement which comprises the combination of at least two cooperating mounts wherein each of said mounts includes a resiliently compressible base member having opposed supporting and supported sides, said supported side being adapted to be supported upon said substructure in a manner to provide frictional resistance to lateral displacement;

a bearing member having opposed supporting and supported sides, said supported side being juxtaposed upon the supporting side of said base member in a manner to communicate thereto static and dynamic load forces exerted upon said bearing member and to receive resilient support from said base member;

equipment supporting means securable to said unit at a selected mounting location;

a shaft-like load and force transferring member engaged in longitudinally adjustable relation with said equipment supporting means, said shaft-like member being adapted to bear in substantially perpendicular relation upon the supporting side of said bearing member in a manner to transmit substantially all static and dynamic load forces received by said equipment supporting member from said unit of equipment to said bearing member and to receive resiliently compressible support from said base member;

strain gauge means secured to a minutely deformable portion of one of said members in a manner to be strained in proportion to the load and support forces exerted by said unit upon said bearing member and the resilient support provided by said base member;

said strain gauge means being provided with conductive means connectable to a source of electrical current and to suitably calibrated read-out means.

7. In a mounting system for supporting a unit of equipment on a substructure, the combination comprising:

a plurality of mounts interposed in supporting relation between said unit of equipment and said substructure;

each of said mounts including a resilient base member, a bearing member superposed thereon, and a shaft-like spacing member supported in substantially perpendicular relation thereon;

a member in each of said mounts having deformation-responsive means incorporated therewith in a manner to be variably deformed in proportion to changes in compressive force exerted upon such member resulting from static and dynamic forces exerted by said unit of equipment and variations in the distribution of such forces between the respective mounts, so as to provide output signals that vary in accordance therewith;

said spacing member being selectively adjustable to vary the static and dynamic forces exerted upon the respective mounts by said unit of equipment at the corresponding mount locations relative to the forces exerted thereby upon mounts at other mount locations, and means responsive to said output signals for providing read-out information regarding said forces.

* * * * *